United States Patent
Massaguer (10) Patent No.: US 11,394,641 B1
(45) Date of Patent: Jul. 19, 2022

(54) CONSENSUS PROTOCOL FOR ROUTE ANNOUNCEMENTS BETWEEN AUTONOMOUS SYSTEMS

(71) Applicant: Amazon Technologies, Inc., Seattle, WA (US)

(72) Inventor: Daniel Massaguer, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 138 days.

(21) Appl. No.: 16/882,243

(22) Filed: May 22, 2020

(51) Int. Cl.
```
G06F 15/173    (2006.01)
H04L 45/42     (2022.01)
H04L 45/24     (2022.01)
H04L 45/00     (2022.01)
H04L 45/02     (2022.01)
```

(52) U.S. Cl.
CPC .............. *H04L 45/42* (2013.01); *H04L 45/04* (2013.01); *H04L 45/24* (2013.01); *H04L 45/566* (2013.01)

(58) Field of Classification Search
CPC ...................................................... H04L 45/42
See application file for complete search history.

(56) References Cited

U.S. PATENT DOCUMENTS

| | | | | |
|---|---|---|---|---|
| 7,180,864 B2 * | 2/2007 | Basu | ................. | H04L 45/02 370/238 |
| 8,884,782 B2 * | 11/2014 | Rubin | ................. | G08G 9/02 340/436 |
| 9,654,482 B2 * | 5/2017 | Gagliano | ............. | H04L 63/108 |
| 10,401,869 B2 * | 9/2019 | Yi | ........................ | B60W 10/20 |
| 10,432,427 B2 * | 10/2019 | Chen | .................... | H04L 47/825 |
| 10,545,466 B2 * | 1/2020 | Wacker | .............. | H04L 12/2816 |
| 10,594,592 B1 * | 3/2020 | Wang | ...................... | H04L 45/22 |
| 10,887,225 B1 * | 1/2021 | Chan | ...................... | H04L 45/20 |
| 11,049,402 B2 * | 6/2021 | Mondello | ............ | G05D 1/0293 |
| 11,070,603 B2 * | 7/2021 | Panagos | ............... | H04L 65/608 |
| 11,153,503 B1 * | 10/2021 | Ebrahimi Afrouzi | ..... | G06T 7/70 |
| 2005/0071502 A1 * | 3/2005 | Kamat | ................... | H04L 45/28 709/239 |
| 2014/0036663 A1 * | 2/2014 | Narayanan | ............ | H04L 45/04 370/230 |
| 2014/0149244 A1 * | 5/2014 | Abhyanker | ........... | G06Q 10/10 705/26.2 |
| 2016/0261493 A1 * | 9/2016 | Li | .......................... | H04L 43/50 |
| 2016/0337174 A1 * | 11/2016 | Jorm | .................. | H04L 41/5041 |
| 2018/0041419 A1 * | 2/2018 | Burgio | .................... | H04L 12/46 |

(Continued)

*Primary Examiner* — Guang W Li
(74) *Attorney, Agent, or Firm* — Knobbe, Martens, Olson & Bear, LLP (57) ABSTRACT

Systems and methods are described to utilize a consensus protocol to determine adoption of network routes between autonomous systems (ASes). One or more routers can act as proposers to the groups, proposing a Border Gateway Protocol (BGP) route. Remaining routers vote on whether to accept or reject the announcement. If a majority of the routers of the group accept the announcement, each router modifies its routing tables to reflect the new route. A token ledger is maintained at each router and updated based on the votes of each router—increasing tokens held by routers who propose accepted routes or vote with the consensus, and decreasing tokens held by routers who proposed declined routes or vote against the consensus. The number of tokens held by a router can indicate the operational correctness of the router in proposing or adopting good network routes.

20 Claims, 8 Drawing Sheets

(56) References Cited

U.S. PATENT DOCUMENTS

| | | | |
|---|---|---|---|
| 2019/0260672 A1* | 8/2019 | Haas | H04L 45/52 |
| 2019/0296915 A1* | 9/2019 | Lancashire | G06Q 20/3825 |
| 2019/0325432 A1* | 10/2019 | Ow | G06Q 20/065 |
| 2019/0333057 A1* | 10/2019 | Miller | G06Q 20/351 |
| 2019/0389658 A1* | 12/2019 | Kim | B65G 1/137 |
| 2021/0096564 A1* | 4/2021 | Panigrahi | G06Q 10/047 |
| 2021/0136071 A1* | 5/2021 | Koeten | H04L 63/102 |
| 2021/0168125 A1* | 6/2021 | Vemulpali | H04L 61/103 |
| 2021/0250295 A1* | 8/2021 | Gu | H04L 41/0893 |

* cited by examiner

CONSENSUS PROTOCOL FOR ROUTE ANNOUNCEMENTS BETWEEN AUTONOMOUS SYSTEMS

BACKGROUND

Generally described, computing devices utilize a communication network, or a series of communication networks, to exchange data. Companies and organizations operate computer networks that interconnect a number of computing devices to support operations or provide services to third parties. Each device on a network is typically assigned a network address, such as an Internet Protocol (IP) address. To ensure correct routing of communications, routers within the network exchange information regarding how to route communications addressed to a given network address.

In some instances, multiple companies and organizations interconnect their networks. For example, the global Internet is a system of many interconnected autonomous systems (each an "AS"). Each AS is associated with specific sets (or "blocks") or network addresses, typically designated by a specific address prefix (designating a first n bits of a network address). The routers of each AS communicate with one another to share information about how traffic should be routed. For example, a router of a first AS may notify a router of a second AS that a given network prefix is routable via the first AS. Thus, if the second AS obtains traffic addressed to an address including the prefix, the second AS can elect to route the traffic to the first AS for delivery to the address. A common protocol to exchange routing information between autonomous systems is the Border Gateway Protocol ("BGP").

A potential problem with the use of BGP between autonomous systems is that a given AS may incorrectly advertise the ability to route a block of network addresses, when the AS cannot in fact route such addresses. This can cause other autonomous systems to route traffic to the given AS that should not or cannot be routed, leading to security concerns (e.g., because traffic is provided to a party that should not obtain it) or errors (e.g., because incorrect routing leads to dropped communications). Advertising incorrect routing information for a given block of network addresses via the BGP protocol is referred to as "BGP hijacking." BGP hijacking can by accident, such as due to hardware malfunction, human error, software error, etc., or maliciously. Due to the security concerns and errors caused, it is desirable to avoid advertising incorrect routing information.

DETAILED DESCRIPTION

Generally described, aspects of the present disclosure relate to managing routing announcements, like BGP announcements, between routers of different autonomous systems in a manner that encourages adoption of correct route announcements, and enables detection and reduction in propagation of incorrect routing announcements. More specifically, aspects of the present disclosure relate to utilizing a consensus protocol between a group of routers of different ASes, such that routes are adopted by individual routers within the group when consensus is reached within the group. Moreover, aspects of the present disclosure relate to monitoring performance of routers within the group with respect to the consensus protocol, by assigning those routers tokens representative of whether routes they propose or accept to the group are in fact adopted. These tokens can then be representative of "reputation" or operational performance of the router among the group, and as such can identify low-performance routers, such as those that frequently proposed routes not adopted by the group, as well as high-performance routers, such as those that frequently propose routes adopted by the group. The tokens assigned to individual routers within the group can therefore be used to detect and diagnose error or problems with those individual routers. Similarly, a desire to accumulate tokens (to indicate high operational performance among the group) can be used to incentivize adoption of correct routes proposed to the group by other routers.

In general, embodiments of the present disclosure may relate to a group of routers each associated with a distinct autonomous system, or AS, in a communication network, such as the Internet. Each AS can provide routing capability for a subset of network addresses, such as IP addresses, such that network packets addressed to addresses within the subset can be routed by the AS to a destination device. In general, routing capabilities for an AS can include devices within that AS, as well as devices of other ASes attached to that AS. A common protocol to announce availability information between ASes is the Border Gateway Protocol (BGP). BGP is known in the art and therefore will not be described in detail. In brief, however, the protocol enables neighboring routers across different ASes (which routers are said to be "peering") to communicate with one another as to the addresses that are reachable via their networks. While embodiments of the present disclosure will be described with respect to BGP, other routing protocols may be utilized. Similarly, while incorrect announcement of routes will be referred to herein as BGP hijacking, it should be understood that this term refers to one type of incorrect announcements, and the examples provided herein may be modified to relate to other protocols and incorrect routing announcements thereon.

In one embodiment, the processes described herein may be implemented at a co-location of multiple ASes, such as an Internet Exchange Point (IXP). At the IXP, routers of multiple ASes may be physically interconnected (e.g., via one or more switches) such that they can exchange information, including BGP announcements. Typically, when a router of a given AS wishes to announce a route to other ASes (via a "BGP announcement"), the router simply makes the announcement to routers of other ASes, which may accept the route (such that the routers of those ASes begin to route packets in accordance with the announcement) or decline the route. In some instances, acceptance of routes is automated, such that human intervention is not required. While the facilitates rapid updating of routes, it can also lead to errors when incorrect routes are accepted. In other instances, acceptance of routes requires manual intervention, such that a route is not accepted until an operator of a receiving AS manually accepts the route. While this can reduce errors, it can also lead to significantly delays in acceptance, resulting in incorrect or inefficient routing prior to acceptance.

To address these issues, routers in embodiments of the present disclosure can adopt a consensus protocol, such that a new route is either adopted by all routers within a group or not accepted by the group. For example, each router within an IXP may join the consensus protocol. When any router wishes to announce a new route, the router can propose the route to the group. Individual routers within the group can then "vote" to accept or reject the route. In this embodiment, if a sufficient number of routers within the group accept (e.g., a simple majority, a super majority defined by a given consensus protocol, etc.), then each router within the group implements the route. If insufficient routers within the group accept, then each router decline to implement the route. Use of such a consensus protocol can facilitate uniform routing among the routers.

Various mechanisms may be used by each router to determine whether to vote to accept or reject a route. In one embodiment, each router accepts all new routes unless that route conflicts with known and verified routing information maintained at the router. For example, a router of a first AS assigned only to a specific block of addresses may reject a route that indicates a second AS is assigned or closer to that block of addresses, or may reject a route that indicates the first AS is associated with another block of addresses. In another embodiment, a router may implement other route verification techniques to determine whether to accept or reject an announcement. For example, the router may implement Resource Public Key Infrastructure (RPKI) validation—a technique known in the art to validate BGP announcements using a public key infrastructure—and utilize such validation to determine whether to vote to accept or reject a route. In some embodiments, each router of the group may implement a different verification technique, for example such that some utilize RPKI validation while others do not. Because each router can generally be incentivized according to the present disclosure to vote in a manner that achieves consensus (while still only accepting valid routes, as reaching consensus for invalid routes can lead to errors on the network), enabling each router to implement a distinct voting mechanism can act to promote the most effect voting mechanism selected, prompting individual networks to adopt more accurate voting mechanisms as time progresses.

The particular threshold of votes needed to reach consensus can vary across embodiments of the present disclosure. In one embodiment, a simple majority is needed to accept a route. In another embodiment, a super majority such as two thirds of all votes is needed. In yet another embodiment, a unanimous vote can be required to accept a route. The threshold can generally be set to balance the need to adopt routes (indicating a lower threshold) versus the desire to avoid accepting incorrect routes (indicating a higher threshold).

Each AS participating in the consensus protocol is illustratively represented by at least one router. Accordingly, BGP hijacking instances that happen, for example, due to software or user error within an AS can be mitigated. Illustratively, if a software error in a first AS causes a router of that AS to announce an incorrect route, the routers of other ASes can vote to reject that route (e.g., due to failed RPKI validation for the announcement), causing the route not to be adopted by the group.

Another potential source of errors in BGP announcements is hardware error, such as a random "bit flip" in a memory module of the router. In one embodiment, this type of error can be further protected against by including within the consensus group multiple routers from a given AS, which can act in concern to announce new routes. For example, when the AS wishes to announce a new route, a new "vote" can be initiated within the consensus group, and each router of the AS can propose the new route. Each router proposing a new route to the group is generally referred to herein as a "proposer." Voting may then occur with each router of the group selecting a route proposed or voting for no route to be adopted. Under non-error conditions, each router of the AS can be expected to propose the same route (e.g., the "correct" route from the point of view of the AS). However, if a router of the AS suffers a hardware error, such as a bit flip that alters the route proposed, such error can be detected by the group. Illustratively, where an AS includes three routers participating the group, two routers may propose the "correct" route, while a third proposes an incorrect route due to hardware error. Each participant of the group can therefore identify the error as the route proposed by a minority of proposers.

Somewhat similarly, regardless of the number of routers proposing routes to the groups, each voter may indicate their vote with the route to be accepted from among any proposals (or, in the case of rejection, a "reject all proposals" vote). This can facilitate detection of communications errors between proposers and non-proposing routers receiving proposals ("receivers"). For example, assume a communication error causes a first route to be proposed, but a given router to "hear" a proposal for a second route. If the router votes to accept that second route, the total number of votes for the second route within the group can be expected to fall below the adoption threshold (e.g., because the error is assumed to be rare), limiting adoption of the incorrect route.

In some embodiments, the consensus protocol discussed above can be further extended by selecting only a subset of routers to act as participants within a given vote. Illustratively, when a vote is to be held to potentially adopt a new route (which may illustratively be initiated by a router desiring to announce a route), each router may randomly select as either an active participant in the vote or a delegator, which delegates their ability to vote to another router of the group. In one embodiment, status as an active participant or delegator may be randomly selected. As a simplistic example, each router in the group may select a number at random, and the routers that selected the lowest n numbers may represent the active participants. Additional mechanisms for selection are discussed in more detail below. Thereafter, a router that is acting as a delegator may select, potentially at random, one of the active participants as their delegate. In one embodiment, a delegate may inform their delegator of the delegate's vote, and the delegator may submit that vote to the group. In another embodiment, the group may be informed of the delegator/delegate relationship, and weigh the vote of the delegate accordingly (e.g., as 1+n, where n is the number of delegators delegating their vote to the delegate). The use of delegation in this manner can encourage operational correctness within the group. That is, because each router may be randomly selected to delegate their vote in a given round, "peer pressure" exists such that the routers are pressed to act in accordance with interests of the group. This can facilitate, for example, rapid replacement of failed routers by administrators, correction of software errors, and the like.

In accordance with embodiments of the present disclosure, performance of a router within the consensus protocol can be measured according to logical "tokens" assigned to each router. In each "round" of voting (which may also be referred to as a "consensus round"), tokens may be earned by proposers who propose accepted routes, and by those that vote in accordance with the group consensus (e.g., to accept an accept route, to decline all proposals, etc.). Similarly, tokens may be lost by proposers who propose non-accepted routes, and by those that vote against the eventual consensus of the group. These tokens can therefore be viewed as indicative of operational correctness (or, informally, "reputation") of each router. If a router is suffering from substantial or common hardware errors, for example, the router would expect to consistently lose tokens, thus reducing its measure of correctness. For example, an administrator of an AS may monitor the number of tokens held by each router, and identify misconfigured or poorly performing routers based on their token count.

The number of tokens gained or lost during each round can be set in accordance with the desired sensitivity to operational correctness. In one embodiment, tokens are illustratively representative of a logical value (e.g., are non-financial), and thus may be created and destroyed independent of effect on a "total pool" of tokens among the group. However, in some embodiments, tokens may be tied to financial value (e.g., coin in a given currency).

As will be appreciated by one of skill in the art in light of the present disclosure, the embodiments disclosed herein improves the ability of computing systems to communicate between disparate networks, by increasing their ability to maintain correct inter-network routing information. Specifically, embodiments of the present disclosure improve on prior announcement techniques by providing an automated mechanism for accepting route announcements between networks while discouraging and minimizing acceptance of incorrect routes. Moreover, the presently disclosed embodiments address technical problems inherent within computing systems; specifically, the inevitable occurrence of errors (e.g., hardware, software, or user) in propagating route announcements and the resulting errors in routing communications over a network. These technical problems are addressed by the various technical solutions described herein, including the use of a consensus protocol to adopt routes among a group of routers, and the use of tokens to represent operational correctness of such routers according to their performance within the consensus protocol. Thus, the present disclosure represents an improvement on existing networking systems.

The foregoing aspects and many of the attendant advantages of this disclosure will become more readily appreciated as the same become better understood by reference to the following description, when taken in conjunction with the accompanying drawings.

Figure 1:
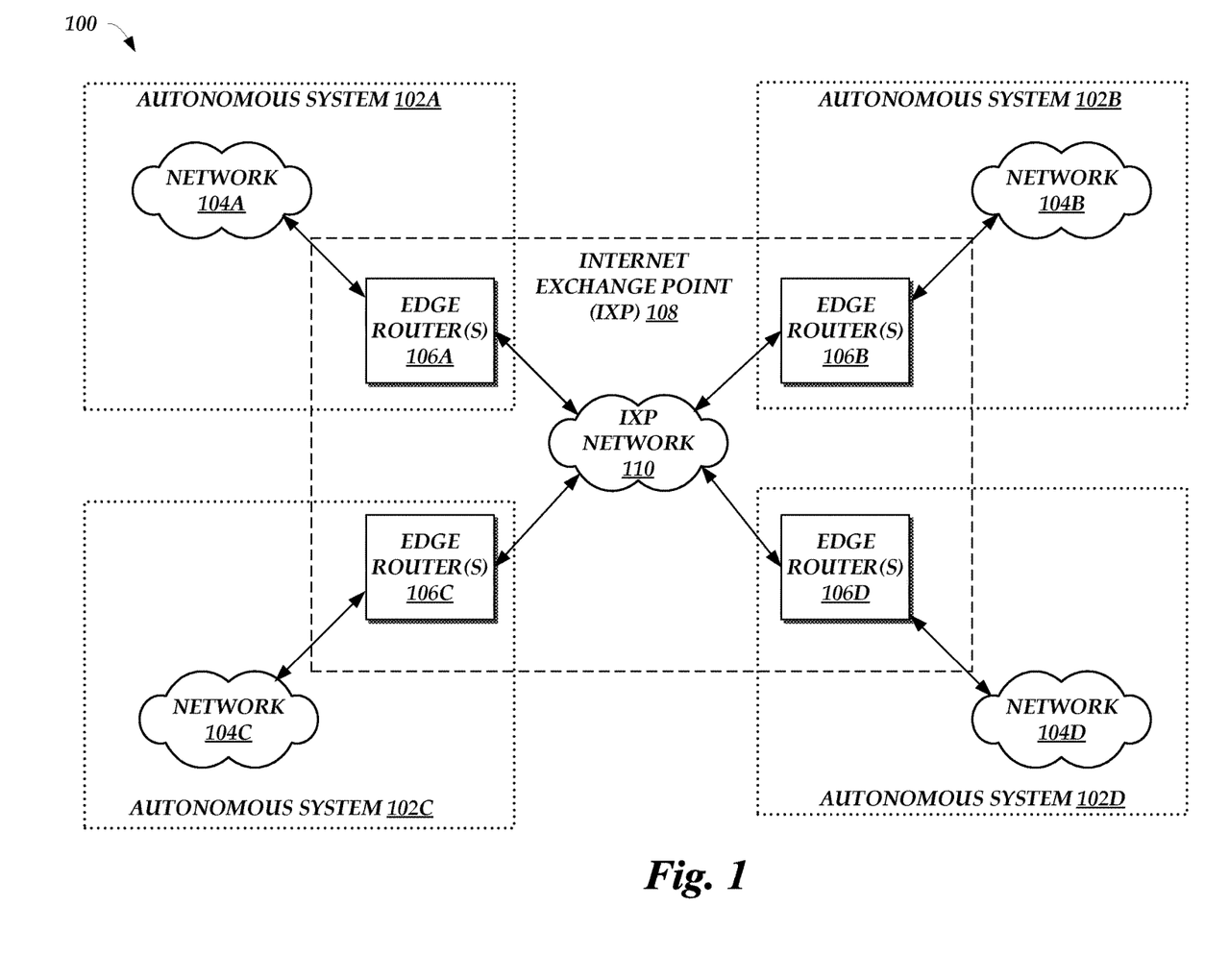
FIG. 1 is a block diagram depicting an illustrative logical network including multiple edge routers associated with respective autonomous systems that are interconnected at an Internet Exchange Point and that can form a consensus group to participate in a consensus protocol to adopt new routes between the autonomous systems.

FIG. 1 is a block diagram depicting an illustrative logical environment 100 including multiple autonomous systems 102. The concept of an autonomous system is known within the art, and that term is used herein in accordance with that known concept. However, in brief, each autonomous system represents a network 104 of interconnected devices associated with one or more sets of network addresses (e.g., designated by address prefixes), which network 104 is typically under control of a single administrative entity. While not shown in FIG. 1, each network 104 can include a variety of client devices, servers, networking devices, and the like. Each AS 102 can connect to other ASes 102 in order to route traffic between the ASes 102. One mechanism for connecting multiple ASes 102 is to utilize an Internet Exchange Point, such as the IXP 108 shown in FIG. 1. The IXP 108 illustratively represents a physical location in which devices of each AS 102—and particularly one or more edge routers 106—can communicate with one another. Each router 106 is logically located at the "edge" of the AS 102, and is therefore referred to as an "edge" router 106. The edge routers 106 of each AS 102 are interconnected via the IXP network 110, which illustratively enables each router 106 to speak to each other router 106 shown in FIG. 1. The IXP network 110 may represent, for example, a network switch to which each router 106 is connected.

To exchange routing information, each router 106 may transmit messages to other routers at the IXP 108. Illustratively, the routers 106 may utilize the BGP protocol to transmit routing information among the ASes 102. Thus, traffic from AS 102A that is addressed to an address associated with AS 102B may, for example, be routed from the network 104A to edge router 106A, on to edge router 106B, and finally to a destination device within the network 104B. While each AS 102 is shown in FIG. 1 as connected to other ASes 102 only via the IXP 108 for simplicity, each AS 102 may also be connected to other ASes 102 at different points, including ASes 102 not shown in FIG. 1. For example, AS 102A may be connected to AS 102B via another IXP 08 not shown in FIG. 1, to a fifth AS 102 not shown in FIG. 1, etc.

In accordance with embodiments of the present disclosure, the edge routers 106A-D may form a consensus group, whereby new routes to be adopted by the routers 106A-D are proposed, evaluated, and implemented via a consensus protocol, as disclosed in more detail below.

Figure 2:
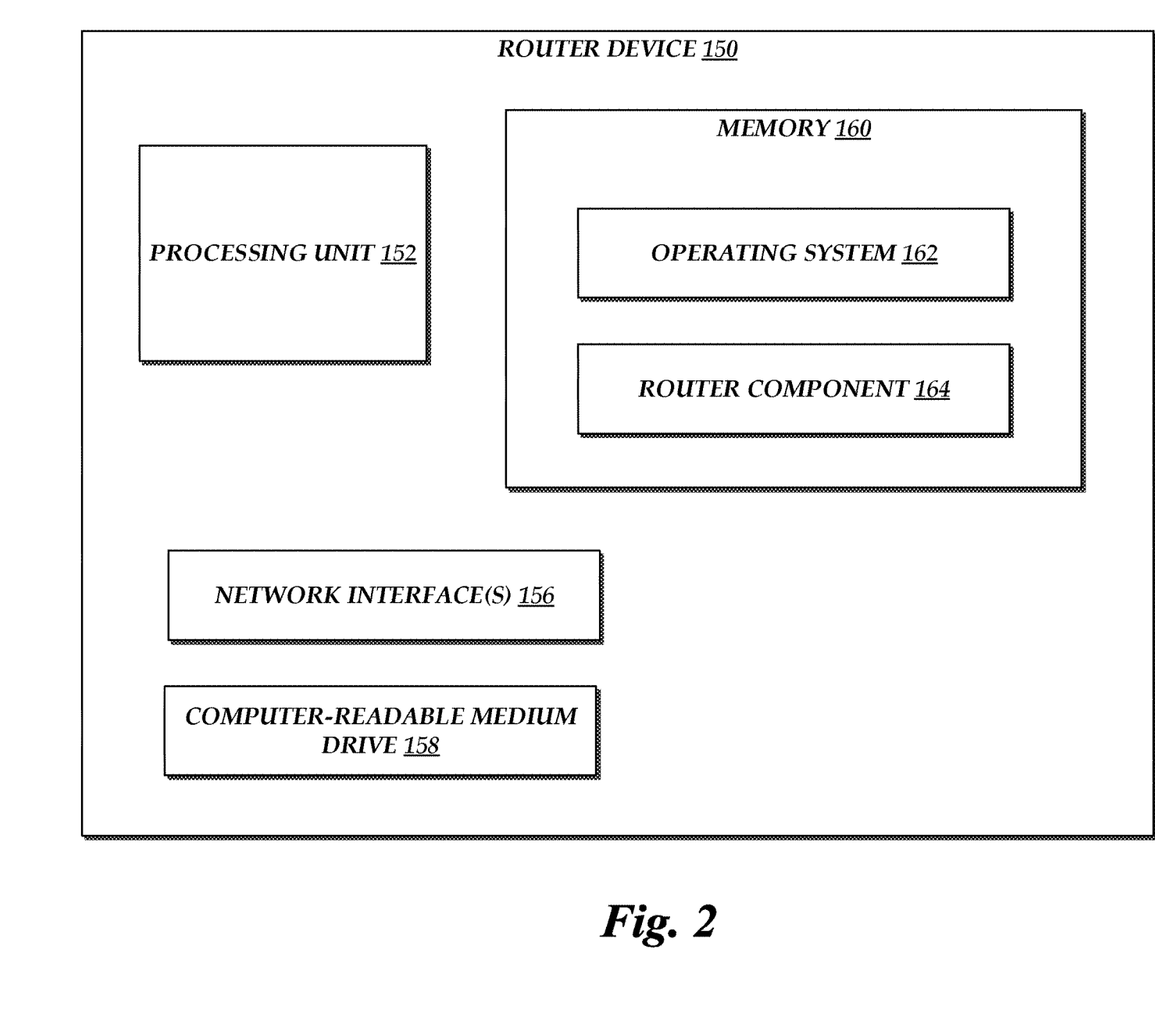
FIG. 2 is a block diagram depicting an illustrative configuration of an edge router 106 of FIG. 1.

FIG. 1B is a block diagram illustrative of components of a router device 150 that may utilized in accordance with the present disclosure. The general architecture of the router device 150 depicted in FIG. 1B includes an arrangement of computer hardware and software components that may be used to implement one or more of the routers 106 of FIG. 1.

As illustrated in FIG. 1B, the router device 150 includes a processing unit 152, at least one network interface 156, and at least one computer readable medium drive 158, all of which may communicate with one another by way of a communication bus. The processing unit 152 may thus receive information and instructions from other computing systems or services via a network. The processing unit 152 may also communicate to and from memory 160.

The memory 160 contains computer program instructions that the processing unit 152 executes in order to operate the router device 150. The memory 160 generally includes RAM, ROM and/or other persistent memory. The memory 160 may store an operating system 162 that provides computer program instructions for use by the processing unit 152 in the general administration and operation of the router device 150. The memory 160 may further include computer program instructions and other information for implementing the router 106, including instructions for executing the routines and processes described herein. While not shown in FIG. 2, the memory 160 may further store information used in the general operation of a router, such as routing tables and the like.

The network interfaces 156 may provide connectivity to one or more networks or computing systems, such as the IXP network 110 and an AS network 104A. The instructions stored within the memory 160 can facilitate routing of data packets between such networks.

The at least one computer readable medium drive 158 can also correspond to RAM, ROM, optical memory, and/or other persistent memory that may persist information used by the router device 150. In some instances, the computer readable medium drive 158 may be implemented in a networked environment in which multiple router devices 150 share access to the information persisted on the computer readable medium drive 158. For example, rather than individually storing a token ledger, multiple devices 150 of the same AS 102 may share access to a common ledger stored in a network environment and accessible via the drive 158.

In an illustrative embodiment, each router 106 may be implemented as a distinct device 150. In another embodiment, multiple routers 106 may be implemented by a single device 150. Those skilled in the art will appreciate that the router device 150 may include many more (or fewer) components than those shown in FIG. 1B, such as dedicated packet processors, application-specific integrated circuits (ASIC), and the like. It is not necessary, however, that all of these generally conventional components of a router be shown in order to provide an enabling disclosure.

Figure 3A:
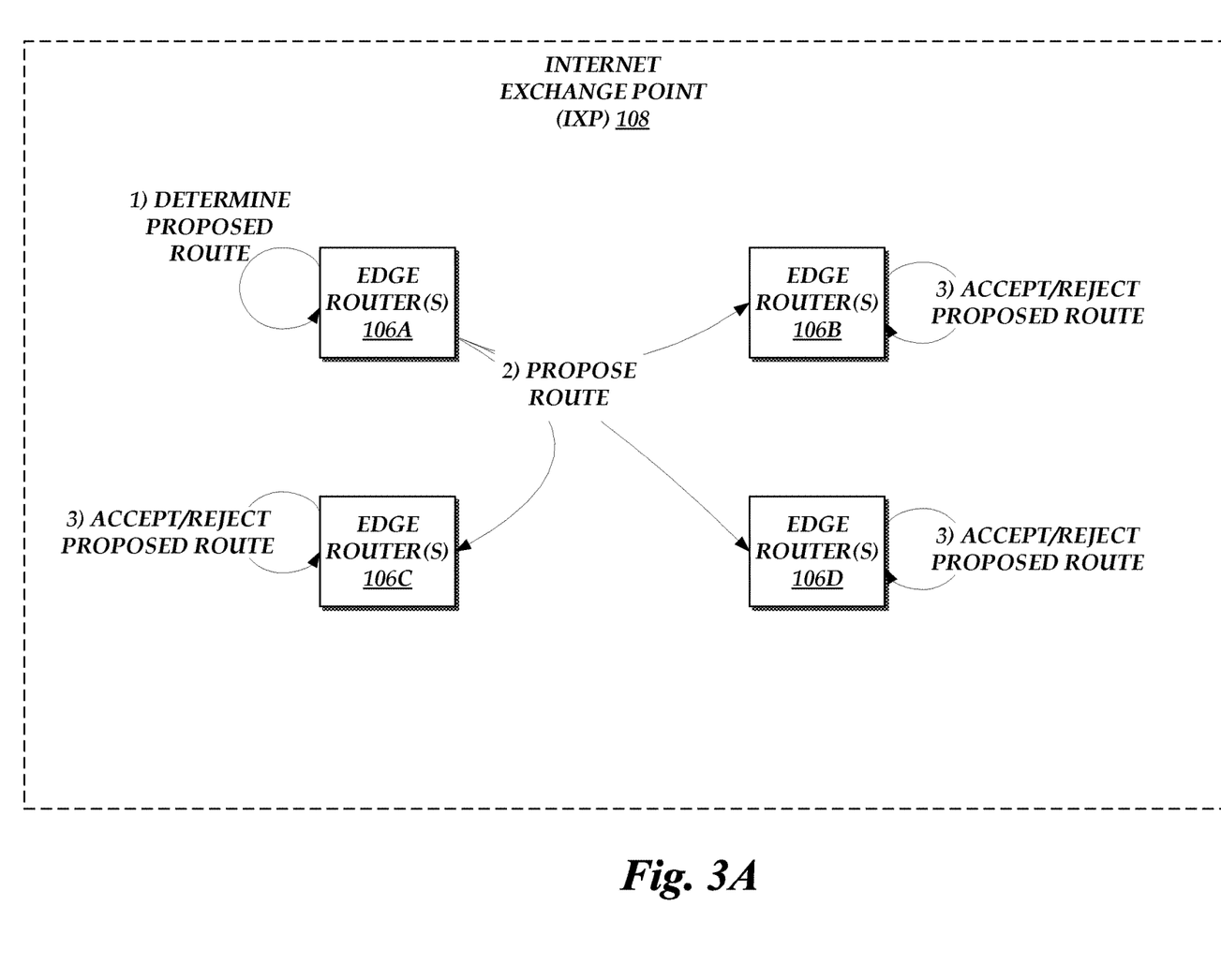
FIGS. 3A-3B are block diagrams depicting illustrative interactions for submitting, evaluating, and arriving at consensus regarding a proposal to add a new route to a set of routers forming the consensus group of FIG. 1.
Figure 3B:
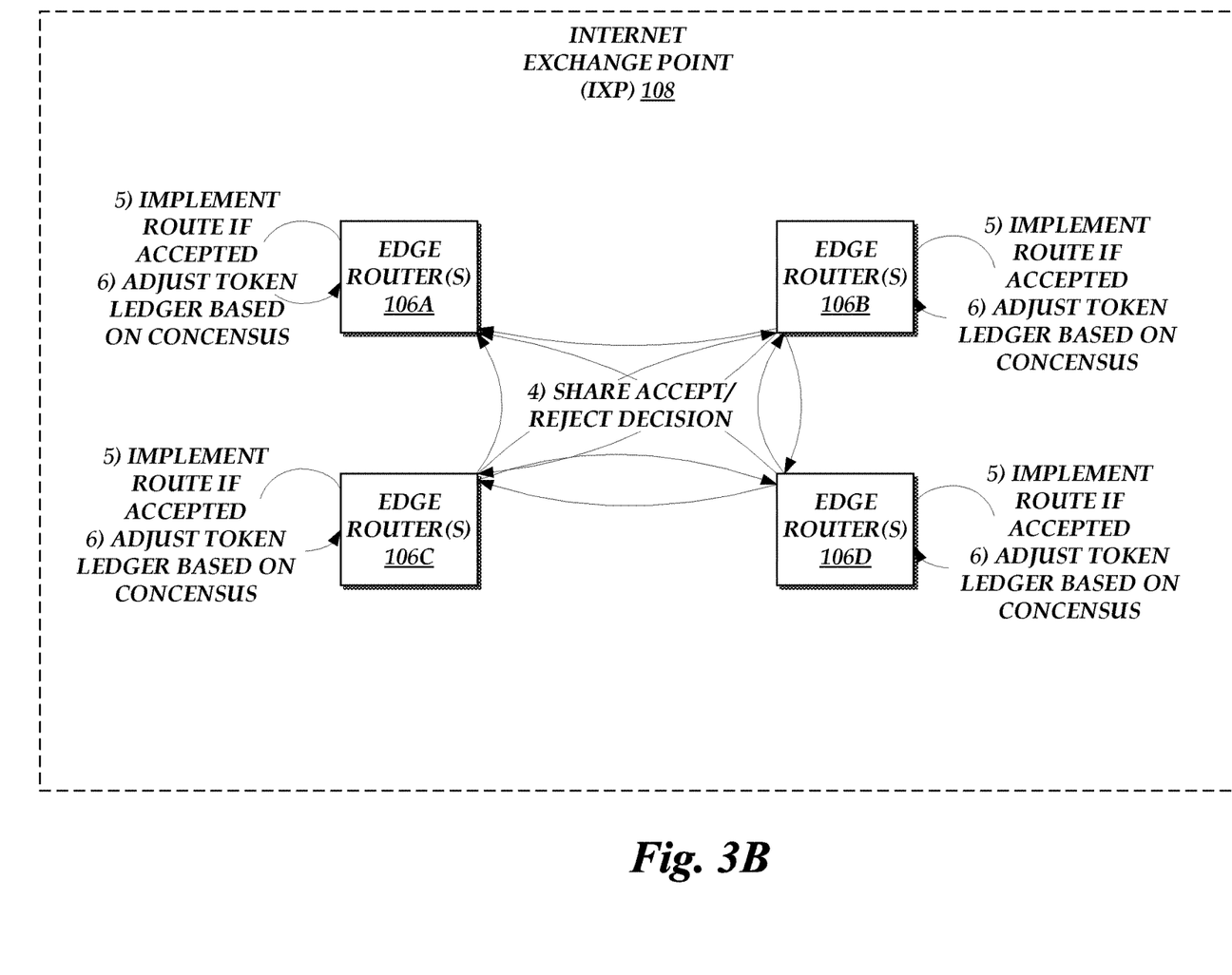

FIGS. 3A-B are block diagram depicting illustrative interactions for conducting a consensus protocol among edge routers 106A-D of FIG. 1. For the purposes of illustration, it will be assumed that the AS 102A associated with edge router 106A wishes to announce a new route to the other ASes 102. For example, a client device on the network 104A may wish to host a website on the AS 102A, and may have purchased an IP address on which to host the site, thereby including the IP address within the set of addresses associated with the AS 102A. For purposes of simplicity, it will be assumed that all routers act as active participants within a voting round, and that the voting round has been initiated among the group (e.g., by any member of the vote transmitting a notification to the group that a voting round is to be initiated).

Accordingly, at (1), the edge router 106A determines the new route to be proposed to the consensus group. At (2), the router 106A then proposes the route to the group. For simplicity, it will be assumed that during the voting of FIG. 3A, a single proposer exists. However, in other instances, multiple proposers may exist, each of which transmits a proposed route to other members of the group. For example, where the AS 102A includes multiple edge routers 106A at the IXP 108, each such router 106A may propose a route at interaction (2).

At interaction (3), each receiver—routers 106B-D—determines its vote to accept a proposed route from those proposed, or to decline all proposals. In one embodiment, each receiver is configured to vote to accept a most-proposed route that does not conflict with authoritative routing information of the AS that includes the receiver (e.g., that does not indicate the proposing AS is authoritative for a route that the router believes the receiving AS is authoritative for). In another embodiment, each received is configured to validate routes via an external information source, such as by implementing RPKI validation for the proposed routes and voting for a most-proposed route that is validated via that validation. In some embodiments, the particular voting mechanism implemented at each router 106 can vary among routers 106 within the consensus group, thereby encouraging each router to adopt a voting mechanism compliant with the mechanisms of others of the group (while simultaneously avoiding adoption of incorrect routes or declining adoption of correct routes, given that these actions inhibit correct operation of the AS 102).

While FIG. 3A depicts a single router 106 for each AS 102, in some embodiments each AS 102 may be represented by one or more routers 106 within the group. In one such embodiment, each router 106 may be associated with a single vote in the group. In another embodiment, to avoid a single AS 102 unduly effecting outcomes of votes, each AS 102 may be associated with a single vote. Illustratively, that vote may be divided among routers 106 of the AS, or the routers 106 of an AS may employ sub-consensus protocol to determine their collective vote in a given voting round.

In FIG. 3A, the proposer, router 106A, is assumed to vote for the route that it has proposed. However, in some embodiments the proposer 106A may also implement a voting mechanism to determine which route to vote for, and may positively transmit that vote to others of the group. For example, the proposer 106A may vote for a most-proposed route, even if that route differs from its own proposed route.

The interactions of FIG. 3A then continue in FIG. 3B, where the receivers share their vote among the group at interaction (4). At (5), each router 106 implements an accepted proposed route, if any such route exists. As noted above, acceptance may be determined by determining whether any proposed route reached a threshold number of votes, which threshold may illustratively be set based on a number of votes (e.g., as 50%, 75%, 100% of votes, etc.) and commonly agreed on among the consensus group. Accordingly, if a proposed route reaches the threshold, each router 106 adopts the route, thereafter routing traffic among the routers in accordance with the proposed route.

In addition, at (6), each router 106 updates a token ledger based on the consensus result and the votes of individual routers. As used herein, the term "token ledger" is intended to refer to a record maintained at each router 106 (or in storage attached to the router 106) of the tokens held by each member of the consensus group. As each router 106 is configured to increment/decrement their individual ledger according to the same mechanism, each ledger can be expected to match the ledger held by other routers 106 among the group. However, in some embodiments, the ledger may be validated among the group by other consensus mechanisms. For example, the ledger may be implemented as a blockchain maintained among the group.

In general, tokens can be increased for routers 106 that propose accepted routes, and for routers 106 that vote to accept those routes. Tokens can be decreased for routers 106 who propose non-accepted routes, and for routers 106 that vote to accept non-accepted routes or vote to decline accepted routes. In some instances, tokens can be increased for routers 106 who vote to decline route that the group agrees to decline, while in other instances no tokens are awarded for voting to decline an eventually-declined route. The specific amounts of increase and decreases made for each such action can vary among embodiments. However, in general, it is envisioned that the penalty for incorrect action—such as proposing a non-accepted route—may exceed the benefit for a correct action. For example, proposing an accepted route may earn one token, and accepting that route may also earn one token. However, proposed a declined route may lose a router 106 10, 100, or all of their tokens. In this manner, correctly functioning routers 106 can accumulate tokens over time, but quickly lose tokens by non-consensus action. The penalty for voting against the eventual consensus may be the same as for proposing a non-accepted route, or may be different. For example, the penalty for voting against the eventual consensus may be less than for proposing a non-accepted route.

It is generally contemplated herein that tokens represent non-financial units, and are representative of operational performance of a device. For example, devices that function in accordance with the group consensus can accumulate tokens, while devices that do not can lose tokens. Thus, administrators can use tokens held by a device as an indicator of whether that device is operating properly. However, in some embodiments, tokens may be tied to a financial instrument, thereby providing financial incentives in addition to the other incentives described herein.

While a set of illustrative interactions are shown in FIG. 3A-3B, these interactions may be modified or expanded. In some instances, a voting round may include multiple round-trip communications between group members. For example, after determining a consensus of the group, each router 106 may be configured to transmit that determined consensus to the group, such that each member of the group verifies the consensus before implementing it. This verification communication may ensure, for example, that errors in communication do not lead to different members of the group determining different consensuses. Furthermore, in some embodiments, the interactions described with respect to FIGS. 3A-B above may be modified such that not all members of the consensus group participate in all voting rounds. For example, the interactions may be modified such that only a random selection of the group participates, and such that others delegate their vote to an active participant. Illustrative interactions for this modification are described below with respect to FIG. 4.

Figure 4:
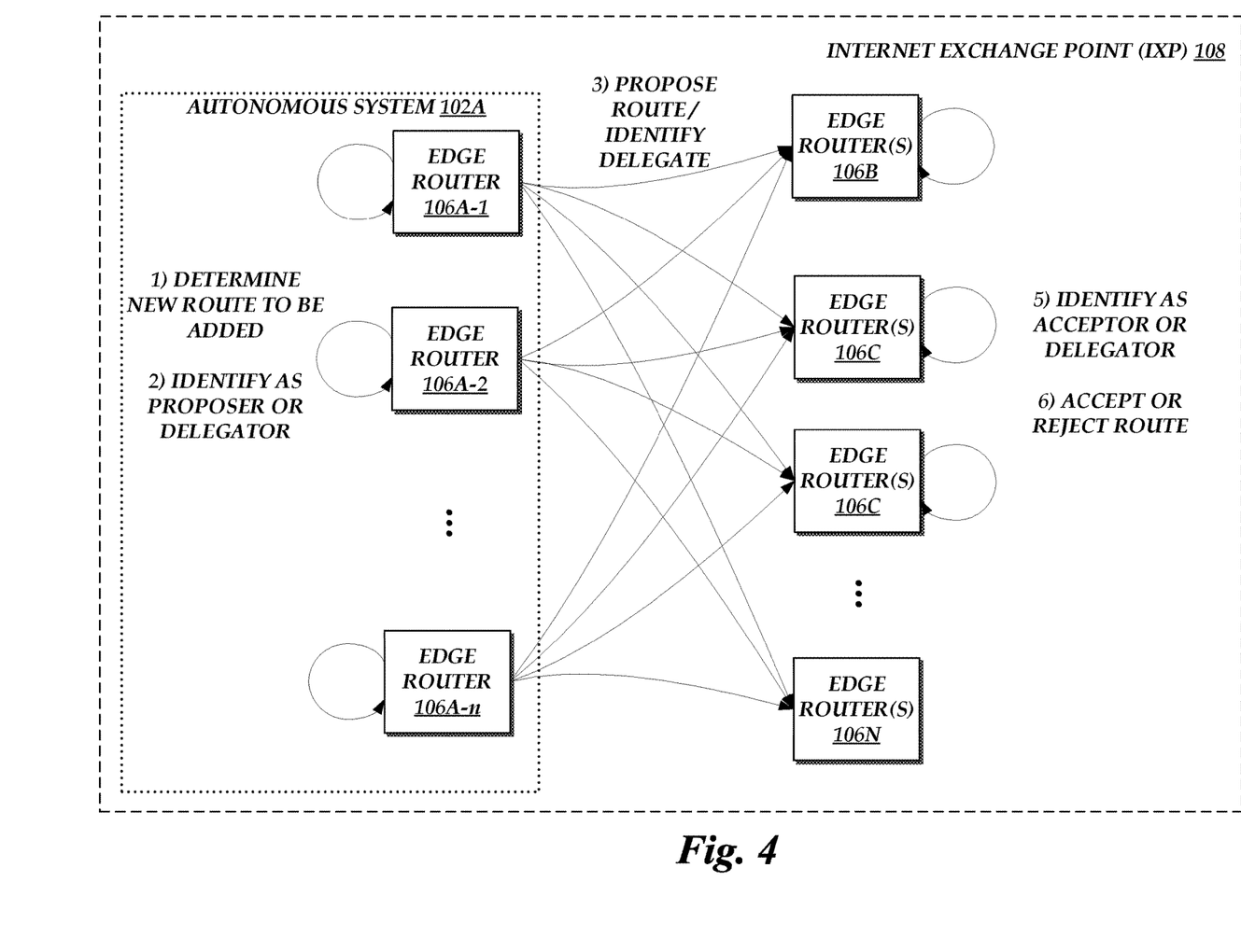
FIG. 4 is a block diagram depicting illustrative interactions for determining active participants and delegators among the consensus group of FIG. 1.

Specifically, in FIG. 4, it is assumed that the AS 102A includes a set of edge routers 106A-1 through 106A-n. Each router 106A, at (1), determines that a new route should be proposed to the group. Thereafter, at (2), each router 106A determines their identity as an active proposer for the round, or as a delegator.

In one embodiment, a number of active proposers is determined as a proportion of total routers 106 wishing to propose a route (e.g., half, 25%, etc.), and each router 106 is randomly selected to be an active proposer or a delegator. Furthermore, each delegator may randomly select a delegate from among the active proposers. For example, each router 106 may randomly select a number in a large range, and n routers 106 associated with a lowest n numbers (where n represents the number of active proposers) can be selected as active. The remaining routers may then select (e.g., randomly) a delegate from among the active proposers. As another example, each router may execute a function that "sleeps" for a pre-determined period of time, and at the end of that period, transmits an announcement to the other routers. Due to potentially random variance, the announcements are expected to be received in a randomized order at each router, and each router may use its position within that order to determine whether to act as an active proposer or delegator (e.g., with a first n % of routers acting as active delegators).

In some instances, to ensure that each router implements random selection, the functions for determining random ordering (e.g., number selection, transmission of a message after sleeping, etc.) may be executed by secure hardware of the router, such as hardware representing a security enclave. Thus, each router may prove to other routers of the system that the function has executed correctly. As another mechanism to provide verifiable random selection, in some embodiments routers 106 may implement cryptographic sortition to determine whether a router 106 participates in voting. Cryptographic sortition is known in the art, and will therefore not be described in detail herein. However, in brief, cryptographic sortition may rely on use of an output of a verifiable random function (VRF)—a function enabling each router 106 to generate a random (e.g., pseudorandom) number in a manner verifiable by each other member of the group. In one example, the output of the VRF may be used directly to sort routers 106. In another embodiment, cryptographic sortition may take into account other variables, such as the number of tokens held by each router 106, to determine active participants in a round, with the probability of each router 106 participating being a function of the proportion of tokens held among all tokens held in the group. Thus, cryptographic sortition can provide a verifiable mechanisms for selecting participants in a voting round.

At (3), each router 106A acts in accordance with their role. Specifically, each router 106A acting as an active proposer can transmit their proposal to receivers in the group. Each router 106A delegating their role can notify the group of their delegate selection, thereby indicating that they have proposed the route proposed by their delegate.

At (4), each receiver identifies as either an active receiver or as a delegator, in a manner similar to interaction (2), above. While interaction (4) is shown in FIG. 4 as occurring after transmission of route proposals, it may in some instances occur contemporaneously with interaction (2). For example, prior to interaction (1), one or more of the routers 106A may notify all members of the group of the start of a voting round, which may cause each member to identify as an active participant or delegator.

After identifying as an active receiver or delegator, the active receivers, at (6), determine whether to vote to accept a proposed route or to reject all routes, similarly to as described above with respect to FIGS. 3A-B. The remaining interactions are similar to interactions (5) and (6), described above, and are therefore not shown in FIG. 4. However, in brief, each active receiver can then notify the group of their vote, similarly to as described above. Each delegating receiver further transmits to the group their selection of a delegate, thus indicating to the group that they've voted in accordance with the vote of the delegate. Each router 106 can then implement a route accepted by the group, if any, and can adjust the token ledger in accordance with the votes of each router 106. In one embodiment, delegators are treated the same as their delegates with respect to adjustments to the token ledger. In another embodiment, delegators receive a portion of the treatment of their delegates with respect to the token ledger (e.g., an adjustment of 25%, 50%, 75%, etc. of the adjustment applied to the delegate).

As noted above, by utilizing the interactions of FIG. 4, each member of the consensus group can expect to, in any given voting round, rely on the actions of another member. Thus, each member is incentivized to act in accordance with the best interests of all members.

Figure 5A:
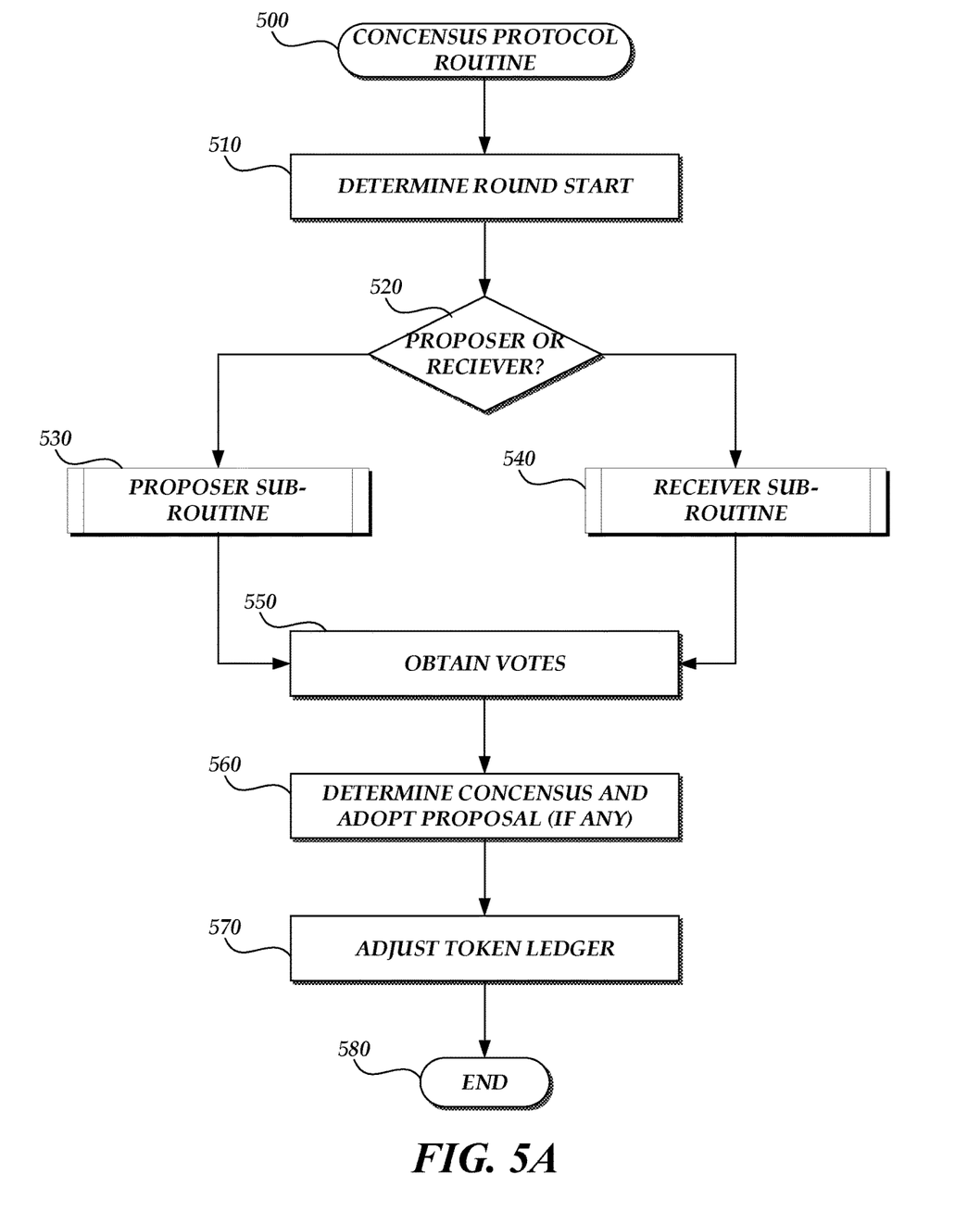
FIGS. 5A-C depict an illustrative routine for implementing a consensus proposal among the consensus group of FIG. 1.

With reference to FIG. 5, an illustrative routine 500 will described from implementing a consensus protocol for sharing routes among peered edge routers. The routine 500 may be individually implemented, for example, by each edge router 106 of FIG. 1, which collective represent a number of different ASes 102. The routers 106 that individually implement the routine 500 will be referred to with reference to FIG. 5 as a consensus group.

The routine 500 begins at block 510, where the edge router 106 determines that a voting round has begun. Illustratively, when one or more routers 106 of the consensus group wish to announce a new route, the router 106 may announce to the group that a voting round will begin, thereby notifying the other routers 106 of the start of the round.

As block 520, the routine 500 varies according to whether the router 106 implementing the routine 500 intends to act as a proposer proposing a new route. If so, the routine 500 continues to block 530: the proposer sub-routine 530 of FIG. 5B. Specifically, with reference to FIG. 5B, if the router 106 intents to act as a proposer, the router 106 determines, at block 532, whether to act as an active proposer or a delegator. As noted above, various techniques may be used to select determine the router 106's role in the round. In one embodiment, the role is randomly selected, e.g., such that a given percentage of all proposers act as active proposers (with at least one proposer always acting as an active proposer).

Figure 5B:
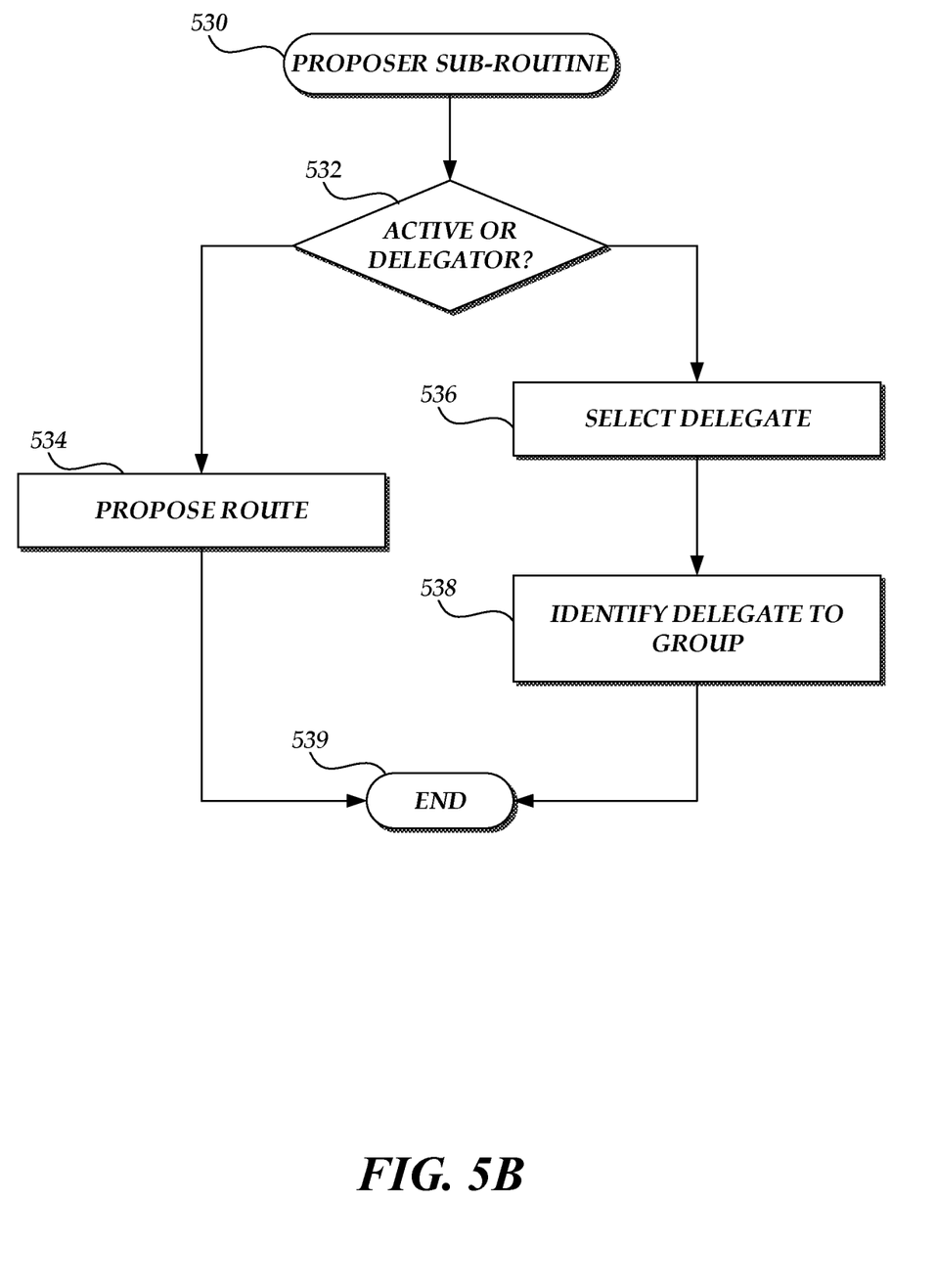

If, at block 532, the router 106 determines to act as an active proposer, the sub-routine 530 proceeds to block 534, where the router 106 proposes a route to the group. For example, the router 106 may propose adopting a BGP announcement among the group, such as an announcement indicating that the AS 102 of the router 106 is authoritative with respect to a given prefix of network addresses, has a route to that prefix of network addresses, etc.

If, at block 532, the router 106 determines to act as a delegator, the sub-routine 530 proceeds to block 536, where the router 106 selects a delegate from among the active proposers. In one embodiment, delegates are chosen at random. In another embodiment, delegates are chosen deterministically, but based on the random selection used to select between active proposers and delegates. For example, where active proposers and delegators are chosen based on selection of a random value, delegators may be ordered based on that value, and be configured to delegate their vote to an active proposer selected based on their ordering among the delegators. Illustratively, if 3 out of 9 proposers are selected as active proposers, the first and fourth delegators may delegate to the first active proposer, the second and fifth delegators may delegate to the second active proposer, and the third and sixth delegators may delegate to the third active proposer. Other deterministic mechanisms of selection based on the previously determined random selection will be apparent to those skilled in the art.

Thereafter, at block 538, the delegators identify their chosen delegate to the consensus group, delegating their vote to the vote of the chosen delegate. The sub-routine 530 then ends at block 539.

Figure 5C:
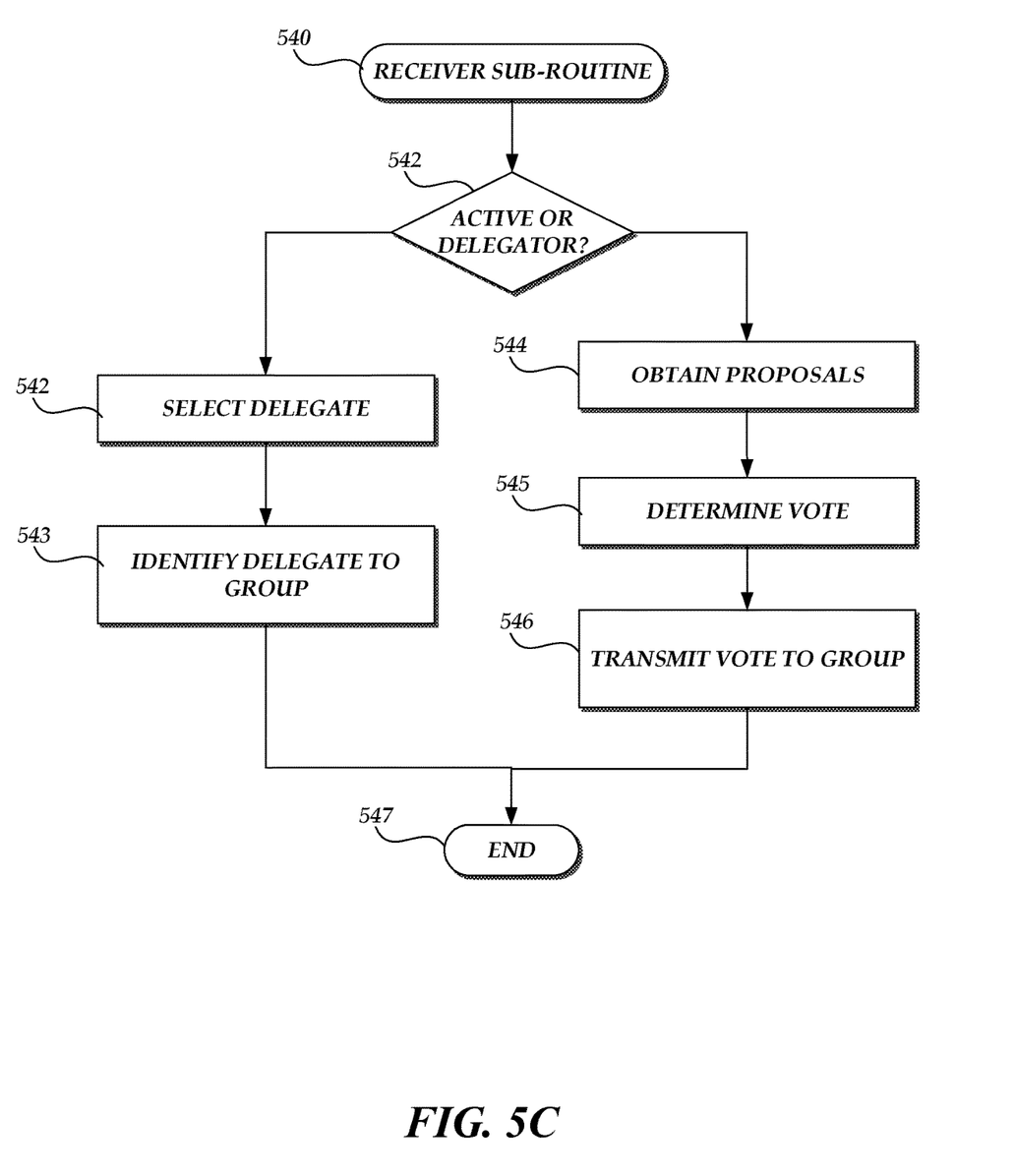

Returning to FIG. 5A, if at block 520 the router 106 determines to act as a receiver, the routine 500 the proceeds to block 540: the receiver sub-routine shown in FIG. 5C. Specifically, as shown in FIG. 5C, during the receiver sub-routine 540, the router 106 determines whether to act as an active voter or a delegator among the group. As noted above, various techniques may be used to select determine the router 106's role in the round. In one embodiment, the role is randomly selected, e.g., such that a given percentage of all members of the group act as voting (e.g., "active") receivers. In one embodiment, the number of active receivers is selected to always exceed the number of active proposers. For example, the minimum number of active receivers may be 2.

If the router 106 determines to act as a delegator, the sub-routine 540 proceeds to blocks 542 and 543, where the router 106 selects a delegate from among the active receivers and identifies that delegate to the group. Blocks 542 and 543 may be implemented similarly to blocks 536 and 538 of FIG. 5B, except with respect to active receivers.

If the router 106 determines to act as an active receiver, the routine 540 proceeds to block 544, where the router 106 obtains proposals from the active proposers, as well as delegate indications from delegating proposers (which indicate an affirmance of the proposal of the indicated delegate, and thus can also be considered a proposal). The router 106 then, at block 545, evaluates the proposals from active and delegating proposers to determine a vote. In one embodiment, the vote may be selected from options including voting for an individual proposal proposed by one or more of the proposers, or voting to adopt no proposals. As discussed above, the specific voting mechanism may vary among individual routers 106. For example, a router 106 may be configured to vote for a most-proposed proposal that does not conflict with authoritative information held at the router 106 (e.g., does not indicate authority for a prefix that the router 106's AS 102 has authority for). As another example, a router 106 may be configured to vote for a most-proposed proposal that passes RPKI validation. Thereafter, at block 546, the router 106 transmits its selected vote to the group. The sub-routine 5540 then ends at block 547.

Returning to the routine 500 of FIG. 5A, in either instance (e.g., after implementing either the proposer sub-routine 530 or the receiver sub-routine 540), the routine 500 proceeds to block 550, where the router 106 obtains the votes for each proposal. Illustratively, each vote may indicate the proposal voted for, or indicate a vote to decline all proposals. In the routine 500, proposers are assumed to have voted to affirm their own proposal. However, in other embodiments, proposers may also act as receivers, and thus the routine 500 may be modified such that sub-routine 540 is implemented subsequent to routine 530 if the router 106 is acting as a proposer.

At block 560, the router 106 determines a consensus result of the group. Consensus to adopt a proposal may require a threshold majority of the group (e.g., a simple majority, super majority, unanimity, etc.), which threshold is mutually set among the routers 106. Thus, if any proposal reaches the threshold majority, the proposal is considered adopted and the router 106 implements the adopted proposal (e.g., by modifying its routing table to adopt the proposed route). If no proposal reaches the threshold majority, no proposal is considered adopted, and the proposals are not adopted by the router 106.

In addition, at block 570, the router 106 adjusts the token ledger for the group in accordance with the proposals, votes, and consensus. For example, as discussed above, the router 106 may increase a token count of each router 106 in the group that voted in accordance with the determined consensus or proposed an adopted route, and decrease a token count of each router 106 that proposed a non-adopted route or voted not in accordance with the consensus. Thus, the token count of a router 106 can be used as an indicator of operational correctness of the router 106. The routine 500 can then end at block 580.

As discussed above, the routine 500 can beneficially maintain synchronization between routers 106 of the group, promoting adoption of correct routes while encouraging non-adoption of incorrect routes. Moreover, the token ledger created during implementation of the routine 500 can assist in diagnosing potential issues on a router 106, such as hardware failures, misconfigurations, etc., that might cause the router 106 to propose incorrect routes or attempt to adopt incorrect routes. Thus, the routine 500 can be used to improve performance of the routers 106.

All of the methods and processes described above may be embodied in, and fully automated via, software code modules executed by one or more general purpose computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
    consensus group including at least three routers in a peering relationship, the at least three routers comprising a first router associated with a first autonomous system, a second router associated with a second autonomous system, and a third router associated with a third autonomous system;
    wherein the first router is configured to propose a Border Gateway Protocol (BGP) network route to the consensus group for adoption;
    wherein the second and third routers are configured to:
        receive proposal of the BGP network route from the first router;
        determine a vote indicating at least one acceptance of the BGP network route or declination the BGP network route;
        transmit the vote to the routers of the consensus group; and
    wherein each individual router of the consensus group is configured to:
        determine the votes of each router of the consensus group;
        determine, based at least in part on whether a threshold number of the votes indicate acceptance of the BGP network route, a consensus of the consensus group, wherein the consensus indicates at least one of adoption of the BGP network route or declining the BGP network route;
        if the consensus indicates adoption of the BGP network route, adopt the BGP network route at the individual router to modify routing of network packets on the individual router; and
        modify a token ledger in accordance with the consensus and votes of each router of the consensus group, wherein the token ledger indicates a number of tokens held by each router of the consensus group, wherein the individual router is configured to increase a number of tokens held by any routers that voted in accordance with the consensus, and to reduce the number of tokens held by any routers that did not vote in accordance with the consensus, and wherein the number of tokens held by a given router indicates an operational performance of the given router.

2. The system of claim 1, wherein the BGP network route indicates that the first autonomous system is authoritative with respect to a network address prefix.

3. The system of claim 1, wherein to determine the vote, the second router is configured to conduct Resource Public Key Infrastructure (RPKI) validation against the BGP network route.

4. The system of claim 1, wherein the third router is configured to vote to accept the proposal unless the BGP network route conflicts with authoritative information maintained at the third autonomous system.

5. A method implemented at a first router associated with a first autonomous system and participating in a consensus group including at least three routers in a peering relationship, the at least three routers including routers from at least two additional autonomous systems, wherein the method comprises:
    receiving a proposal from a second router within the consensus group proposing adoption of a network route among the routers of the consensus group;
    determining a vote indicating at least one of acceptance of the proposal or declination the proposal;
    transmitting the vote to the routers of the consensus group;
    obtaining votes regarding the proposal from individual routers of the consensus group;
    determining, based at least in part on whether a threshold number of the votes indicate acceptance of the proposal, a consensus of the consensus group, wherein the consensus indicates at least one of adoption of proposal or declination of the proposal;

determining that the consensus indicates adoption of the proposal and modifying routing of network packets on the first router in accordance with the network route; and modifying a token ledger in accordance with the consensus and votes of each router of the consensus group, wherein the token ledger indicates a number of tokens held by each router of the consensus group, and wherein the number of tokens held by a given router indicates an operational performance of the given router.

6. The method of claim 5, wherein the proposal represents a BGP announcement.

7. The method of claim 5, wherein the threshold number is set to represent at least one of a simple majority of the consensus group, a super majority of the consensus group, or all of the consensus group.

8. The method of claim 5 further comprising receiving a plurality of additional proposals, the plurality of additional proposals including at least one to adopt a second network route among the routers of the consensus group, wherein determining the vote comprises determining to vote for acceptance of the first network route, for acceptance of the second network route, or for declining all proposals.

9. The method of claim 8, wherein determining the vote comprises identifying the network route, from at least the first and second network routes, most proposed among the consensus group.

10. The method of claim 8, wherein the consensus group includes multiple routers associated with the first autonomous system, and wherein in votes of each router associated with the first autonomous system are weighted inversely to the number of routers associated with the first autonomous system in the consensus group.

11. The method of claim 8 further comprising, prior to determining the vote, determining that the first router is to actively participate in a vote for the proposal based at least in part on random selection from among the consensus group, wherein the votes regarding the proposal include at least one delegation vote indicating that a router within the consensus group has delegated their vote to an active participant in the vote for the proposal.

12. The method of claim 11, wherein the random selection is implemented based at least in part on execution of a function on a security enclave.

13. The method of claim 11, wherein the random selection is implemented based at least in part on execution of a cryptographic sortition algorithm.

14. A system comprising:
a first router associated with a first autonomous system and participating in a consensus group including at least three routers in a peering relationship, the at least three routers including routers from at least two additional autonomous systems, wherein the first router is configured to:
receive a proposal from a second router within the consensus group proposing adoption of a network route among the routers of the consensus group;
transmit to the routers of the consensus group a vote indicating at least one acceptance of the proposal or declination the proposal;
obtain votes regarding the proposal from individual routers of the consensus group;
determine, based at least in part on whether a threshold number of the votes indicate acceptance of the proposal, a consensus of the consensus group, wherein the consensus indicates at least one of adoption of proposal or declination of the proposal;
if the consensus indicates adoption of the proposal, modify routing of network packets on the first router in accordance with the network route; and
modify a token ledger in accordance with the consensus and votes of each router of the consensus group, wherein the token ledger indicates a number of tokens held by each router of the consensus group, and wherein the number of tokens held by a given router indicates an operational performance of the given router.

15. The system of claim 14, wherein modifying the token ledger in accordance with the consensus and votes of each router of the consensus group comprises reducing to zero the number of tokens held by any router that voted not in accordance with the consensus.

16. The system of claim 14, wherein modifying the token ledger in accordance with the consensus and votes of each router of the consensus group comprises reducing to zero the number of tokens held by any router that made a proposal not adopted in the consensus.

17. The system of claim 14, wherein to determine the vote, the first router is configured to applying a voting algorithm to the proposal that is different from a second voting algorithm implemented by a second router in the consensus group.

18. The system of claim 14, wherein the network route indicates that a set of network addresses are routable via a second autonomous system.

19. The system of claim 14, wherein the first router is further configured to determine whether the first router is to actively participate in a vote for the proposal based at least in part on random selection from among the consensus group, wherein the first router is configured to transmit the vote indicating at least one acceptance of the proposal or declination the proposal only when it is determined that the first router is to actively participate in the vote.

20. The system of claim 19, wherein the first router is further configured to, on determining that the first router is not to actively participate in a vote, to:
randomly select, among routers of the consensus group selected to actively participate in the vote, a delegate; and
transmit to the consensus group an identifier of the delegate.

* * * * *